United States Patent
Slater et al.

(10) Patent No.: US 8,419,297 B2
(45) Date of Patent: Apr. 16, 2013

(54) APPARATUS FOR MECHANICALLY SPLICING OPTIC FIBERS

(75) Inventors: Brett Hoe Slater, Mount Colah (AU); Brent David Allwood, Buttaba (AU); Bryce Nicholls, Green Point (AU)

(73) Assignee: ADC GmbH, Berlin (DE)

( * ) Notice: Subject to any disclaimer, the term of this patent is extended or adjusted under 35 U.S.C. 154(b) by 217 days.

(21) Appl. No.: 13/037,053

(22) Filed: Feb. 28, 2011

(65) Prior Publication Data

US 2011/0214275 A1 Sep. 8, 2011

(30) Foreign Application Priority Data

Mar. 3, 2010 (AU) .................................. 2010200818

(51) Int. Cl.
*C03B 37/16* (2006.01)
*G02B 6/25* (2006.01)

(52) U.S. Cl.
USPC .............................................. 385/98; 65/407

(58) Field of Classification Search .................... 385/98; 65/407
See application file for complete search history.

(56) References Cited

U.S. PATENT DOCUMENTS 5,018,824 A * 5/1991 Ooe et al. .................... 385/99
8,068,713 B2 * 11/2011 Mazzali et al. ............... 385/137

* cited by examiner

*Primary Examiner* — Jerry Rahll
(74) *Attorney, Agent, or Firm* — Merchant & Gould P.C.

(57) ABSTRACT

An apparatus for mechanically splicing two optic fiber cores, including two holder bodies, moveable relative to each other, each of which includes a retaining device configured to receive, and hold, end sections of said optic fiber cores; and a scoring device coupled with the holder bodies and operable to move along a trajectory relative to the holder bodies, each retaining device being arranged so that said end sections extend therefrom through said trajectory, wherein the scoring device scores the end sections of said optic fiber cores upon movement along the trajectory, and further movement of the scoring device along the trajectory forces the holder bodies away from each other to cleave the end sections of the optic fiber cores; and relative movement of the holder bodies brings cleaved end sections together to affect mechanical splicing of the optic fiber core.

10 Claims, 6 Drawing Sheets

APPARATUS FOR MECHANICALLY SPLICING OPTIC FIBERS

This application claims benefit of Serial No. 20102008818, filed 3 Mar. 2010 in Australia and which application is incorporated herein by reference. To the extent appropriate, a claim of priority is made to the above disclosed application.

TECHNICAL FIELD OF THE INVENTION

The present invention relates to a method and apparatus for splicing optic fiber.

BACKGROUND OF THE INVENTION

An optical connection between optic fiber can be effected by fusion or mechanical splicing. In general, fusion splicing involves joining two optic fiber end-to-end and effecting optical connection using heat and mechanical splicing involves holding two optic fiber in alignment so that light can pass from one to another.

Previously, the equipment used to effect fusion splicing is cumbersome and relatively expensive. Further the equipment may not be readily portable.

For mechanical splicing, fiber cores are either passively or actively aligned. Passive alignment relies on precision reference surfaces, generally grooves or cylindrical holes, to align fiber cores during splicing. Active alignment involves the use of light for accurate fiber alignment, and may consist of either monitoring the loss through the splice during splice alignment or by using a microscope to accurately align the fiber cores for splicing. To monitor loss, either an optical source and optical power meter or an optical time domain reflectometer (OTDR) are used.

In many circumstances, the above-described splicing methods either produce inaccurate results or take too long to precisely align optic fiber. Also, human error is prevalent in splicing operations performed in the field (i.e. splices made in cables mounted to telegraph poles) due to movement of the operator, time pressures, or simply due to the degree of accuracy required to ensure a precise splice.

In addition to the above mentioned difficulties with mechanical and fusion splicing, the ends of the optic fiber typically need to be cleaved before splicing is effected. A cleave is a deliberate, controlled break, intended to create a perfectly flat end face, perpendicular to the longitudinal axis of the fiber. A cleave is typically made by first introducing a microscopic fracture ("nick") into the fiber with a special tool which has a sharp blade of some hard material, such as diamond, sapphire, or tungsten carbide. If proper tension is applied to the fiber as the nick is made, or immediately afterward, then the fracture will propagate in a controlled fashion, creating the desired end face. The cleaving process involves the use of specialised equipment that is relatively expensive and may not be readily portable for a technician to take from job to job.

It is generally desirable to overcome or ameliorate one or more of the above mentioned difficulties, or at least provide a useful alternative.

SUMMARY OF THE INVENTION

In accordance with one aspect of the invention, there is provided an apparatus for mechanically splicing two optic fiber cores, including:

two holder bodies, moveable relative to each other, each of which includes a retaining device configured to receive, and hold, end sections of said optic fiber cores; and a scoring device coupled with the holder bodies and operable to move along a trajectory relative to the holder bodies, each retaining device being arranged so that said end sections extend therefrom through said trajectory, wherein the scoring device scores the end sections of said optic fiber cores upon movement along the trajectory, and further movement of the scoring device along the trajectory forces the holder bodies away from each other to cleave the end sections of the optic fiber cores; and relative movement of the holder bodies brings cleaved end sections together to affect mechanical splicing of the optic fiber core.

Preferably, the scoring device includes a first part of a sliding coupling and the holder bodies include a second part of the sliding coupling, the sliding coupling being arranged to guide the movement of the scoring device, wherein the sliding coupling is at least partially transversely disposed relative to the trajectory of the scoring device, such that movement of the scoring device along the trajectory causes at least one said holder body to move in a direction transverse to the trajectory, to align the optic fiber cores.

Preferably, the scoring device includes a substantially wedge-shaped actuator having two faces diverging away from each other, the first part of the sliding coupling being provided on both faces, and wherein movement of the scoring device along the trajectory moves the holder bodies up the faces in the direction of the divergence, thereby forcing the holder bodies away from each other to place the optic fiber cores in tension to affect cleaving thereof.

In accordance with another aspect of the present invention, there is provided a method for splicing two exposed optic fiber cores, using the apparatus as claimed in any preceding claim, including the steps of:

inserting end sections of optic fiber cores into retaining devices of respective holder bodies, thereby positioning said end sections for scoring by the scoring device;

operating the scoring device to move along the trajectory to score said end sections;

operating said scoring device to move further along said trajectory to urge the holder bodies apart to cleave the end sections; and moving said holder bodies relative to one another to affect mechanical splicing of said optic fiber cores.

Advantageously, preferred embodiments of the present invention allow the accurate splicing of optic fiber cores in the field, substantially removing the risk of operator error by mechanically controlling the cleaving and aligning processes.

Advantageously, preferred embodiments of the present invention place the optic fiber cores in tension before, or during, cleaving in order to improve the accuracy of the cleave.

BRIEF DESCRIPTION OF THE DRAWINGS

Preferred embodiments of the present invention are hereafter described, by way of non-limiting example only, with reference to the accompanying drawings in which.

DETAILED DESCRIPTION OF PREFERRED EMBODIMENTS

Figure 2:
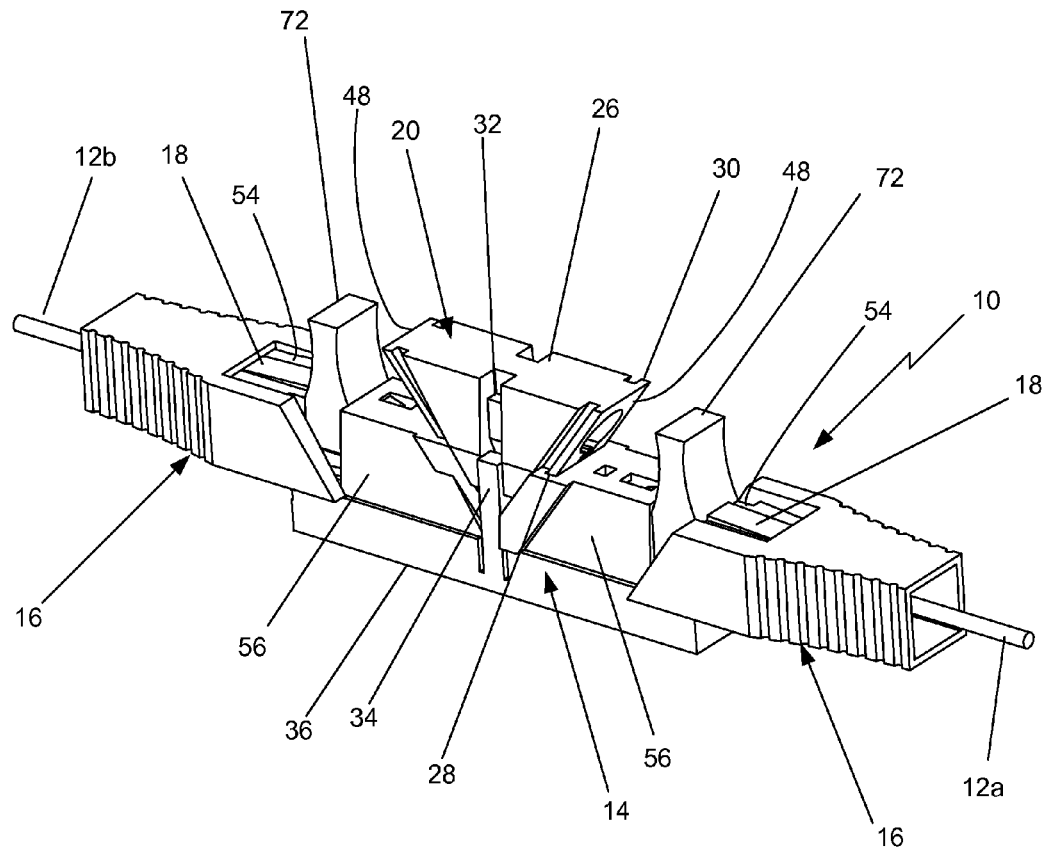
FIG. 2 shows a side perspective view of the apparatus of FIG. 1.
Figure 3:
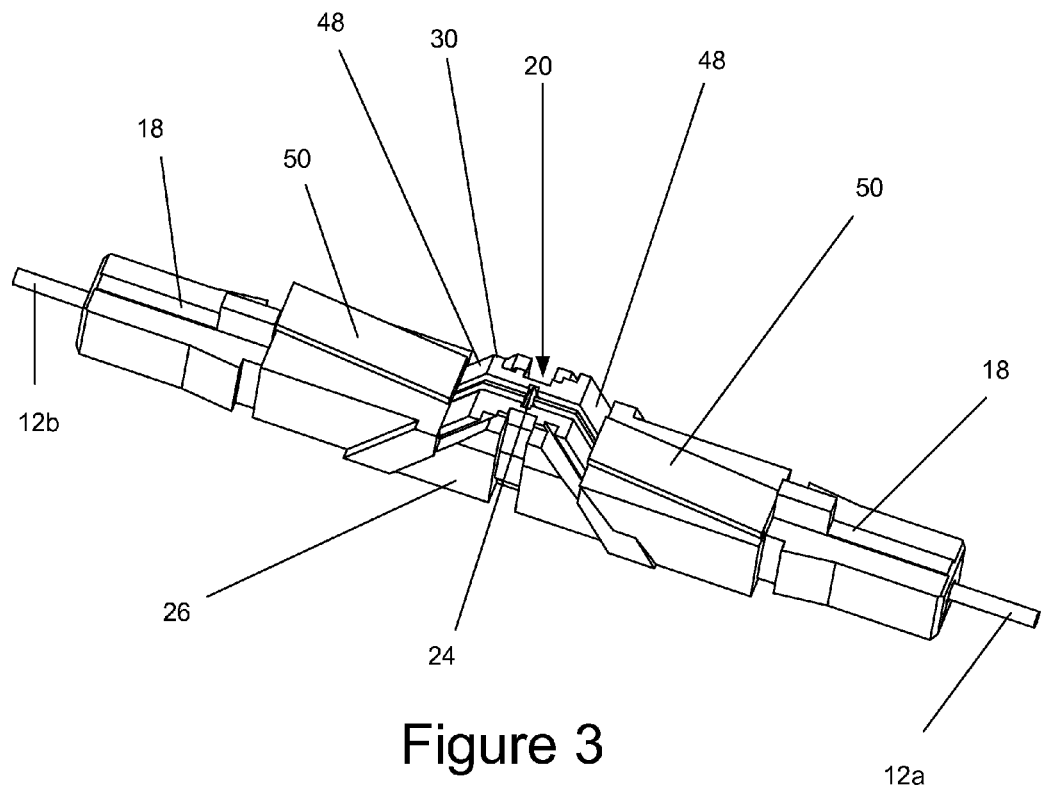
FIG. 3 shows a bottom perspective view of the apparatus of FIG. 1, partially disassembled.
Figure 4:
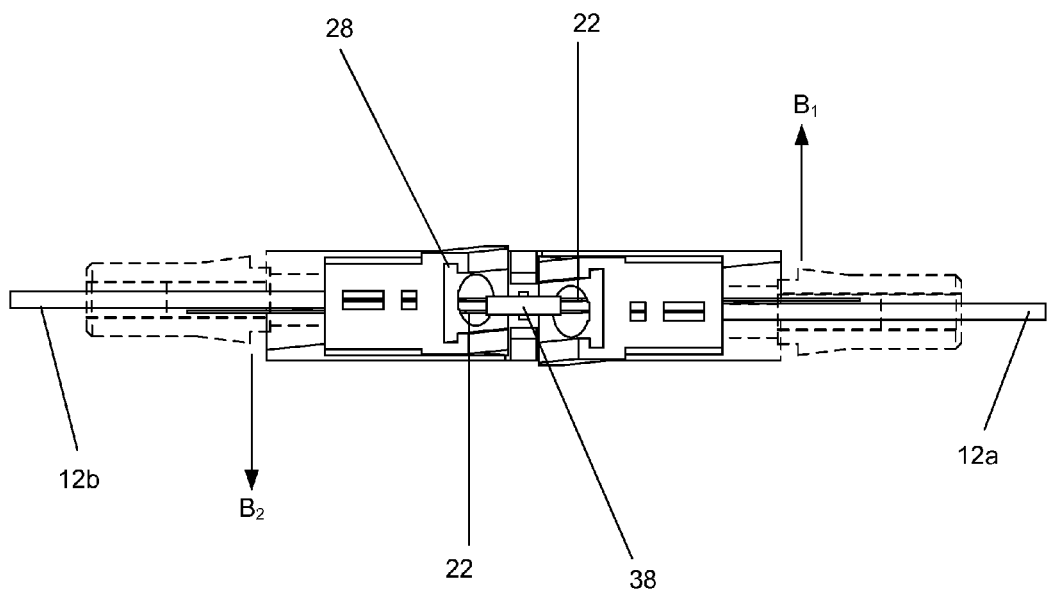
FIG. 4 shows a top view of the apparatus of FIG. 1, partially disassembled.

The apparatus 10 shown in FIGS. 1 to 11 is used to mechanically splice two optic fiber cores 12a, 12b. The apparatus 10 includes two holder bodies 16, moveable relative to each other, each of which includes a retaining device 18. The apparatus 10 further includes a scoring device 20 coupled with the holder bodies 16 and operable to move along a trajectory $D_x$ relative to the holder bodies 16 and between the retaining devices 18. When used, the retaining devices 18 receive, and hold, end sections 22, as shown in FIG. 4, of the optic fiber cores 12a, 12b so that they extend from respective retaining devices 18 through the trajectory $D_x$ of the scoring device 20. The scoring device 20 scores the end sections 22 upon movement along the trajectory $D_x$ and further movement of the scoring device 20 along the trajectory $D_x$ forces the holder bodies 16 away from each other to cleave the end sections 22 of the optic fiber cores 12a, 12b. Finally, relative movement of the retaining devices 18 brings the cleaved end sections 22 together to affect mechanical splicing of the optic fiber cores 12a, 12b. In this manner, the apparatus 10 can be used to quickly and easily cleave and mechanically splice two optic fiber cores 12a, 12b.

The scoring device 20, as particularly shown in FIG. 3, includes a blade 24, coupled to a substantially wedge-shaped, externally depressible actuator 26, for scoring the end sections 22 (not shown) of the optic fiber cores 12a, 12b seated in the retaining devices 18. The actuator 26 translates along guides, in the present case tracks 28 shaped to accommodate rails 30 as shown in FIG. 2, between an insertion condition and a splicing condition. In the insertion condition, end sections 22 are inserted into respective retaining devices 18 until each end section 22 extends from the retaining device 18 into which it was inserted, through the trajectory $D_x$ of the scoring device 20 and into the opposite retaining device 18, as shown in FIG. 4 (the retaining devices 18 being shown in broken lines). The end sections 22 are then secured by the retaining devices 18 on either side of the trajectory $D_x$, to assist cleaving, as discussed below. In the splicing condition, the end sections 22 have been cleaved and the holder bodies 16 have been moved by the actuator 26 to a position in which the optic fiber cores 12a, 12b are aligned. The scoring device 20 further includes a notched groove 32 for receiving a tang 34 extending from the base 36, so that, when in the splicing condition, the tang 34 is received in the notched groove 32 in order to hold the scoring device 20 in fixed relation to the base 36. At this stage, the cleaved end sections 22 can be brought together in a ferrule 38 provided in the scoring device 20, by movement of the holder bodies 16 towards each other, in order to splice the optic fiber cores 12a, 12b. The ferrule 38 may contain an index matching gel, or similar, as required.

Figure 1:
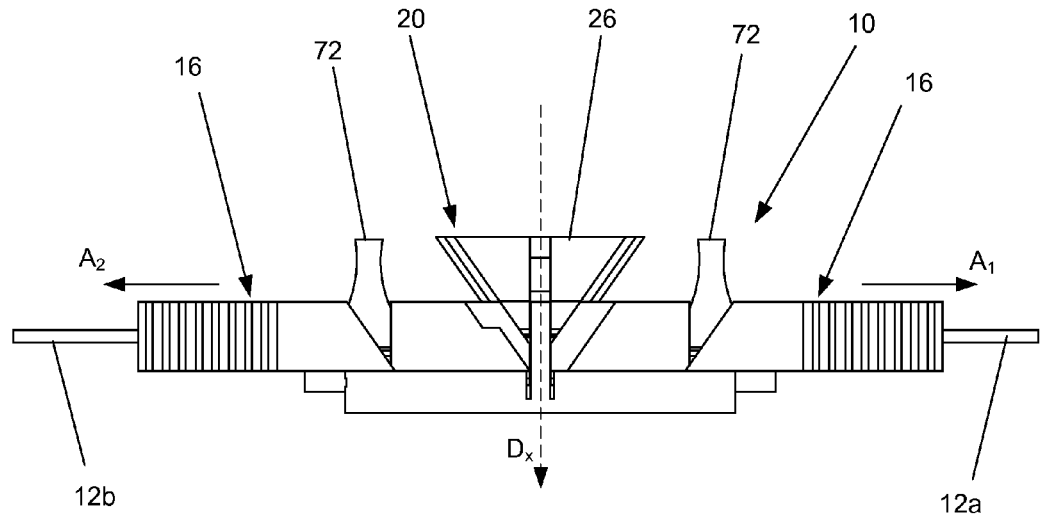
FIG. 1 shows a side view of an apparatus for mechanically splicing two optic fiber cores.
Figure 5:
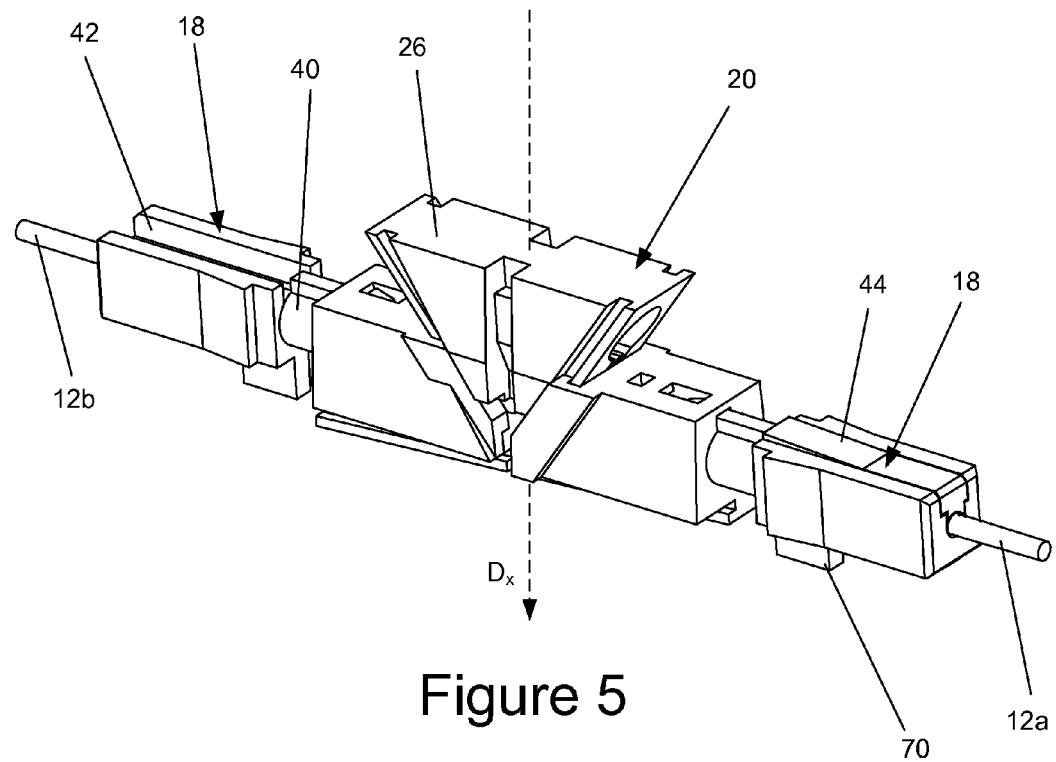
FIG. 5 shows a side perspective view of the apparatus of FIG. 1, partially disassembled.

In order to retain the end sections 22 in the retaining devices 18, each retaining device 18, as shown in FIG. 5, includes a sleeve 40, a channel portion 42 operatively connected to the sleeve 40, and an insert 44 shaped for insertion into the channel portion 42 (though one insert 44 is not shown so that the configuration of the corresponding channel portion 42 is visible). An end section 22 of an optic fiber core 12a, 12b is located in the channel portion 42 and the insert 44 is thereafter inserted into the channel portion 42 to apply a clamping force to the end section 22 and thereby retain it in the retaining device 18. Once the inserts 44 of both retaining devices 18 have been inserted into respective channels 42, each end section 22 is secured on both sides of the trajectory $D_x$ of the scoring device 20 as mentioned above. This limits the ability of the end sections 22 to flex away from the blade 24 when being scored. In addition, the actuator 26 is wedge-shaped—thus the faces 45 of the actuator 26 are diverge away from the blade 24. Therefore, as the actuator 26 moves along the trajectory $D_x$ the holder bodies 16 translate up the faces 45 and are forced apart in directions $A_1$, $A_2$, as shown in FIG. 1, due to the divergence of those faces 45.

Figure 6:
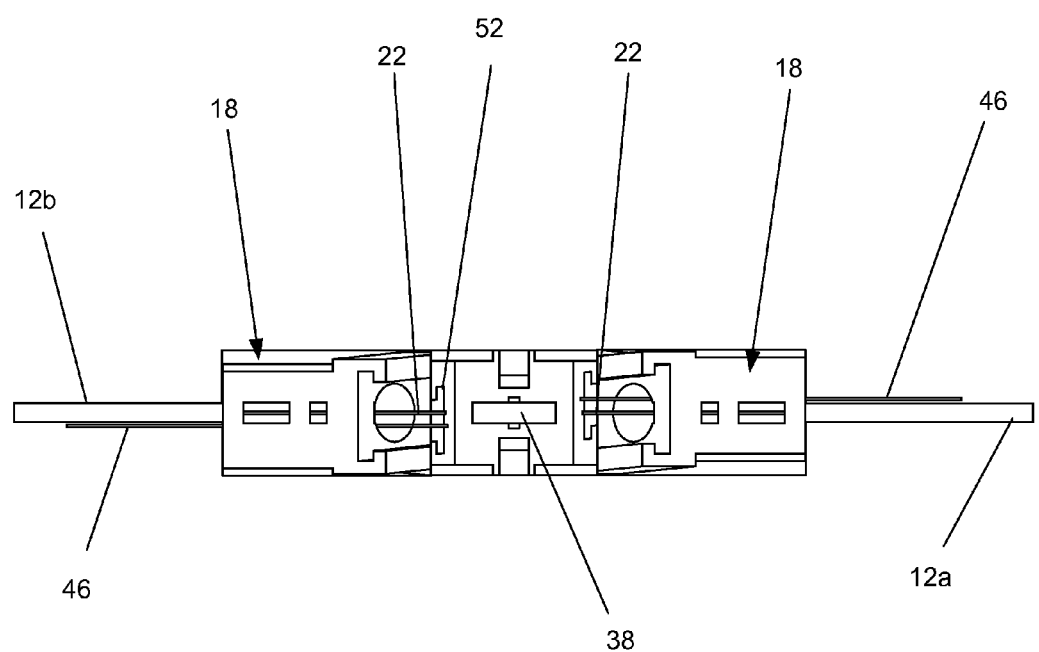
FIG. 6 shows a top view of the apparatus of FIG. 1, partially disassembled.
Figure 7A:
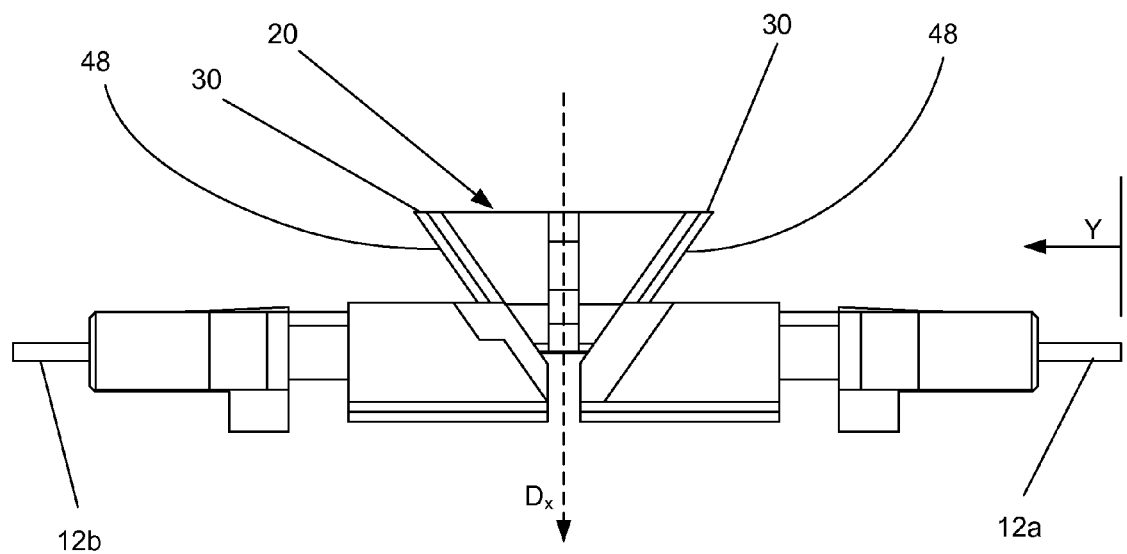
FIG. 7A shows a side view of the apparatus of FIG. 1, partially disassembled.
Figure 7B:
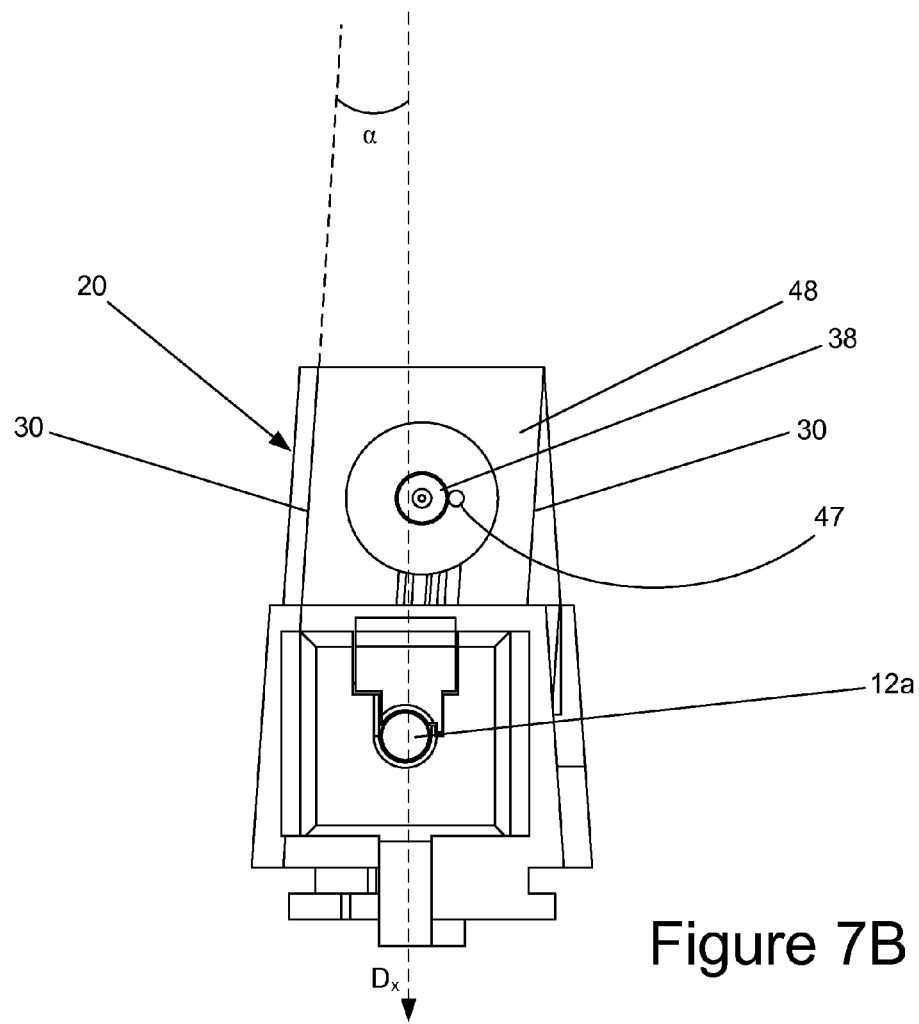
FIG. 7B shows an end view of the apparatus of FIG. 7A, taken from direction Y.

Since each end section 22 is held by both retaining devices 18, the force of the holder bodies 16 moving apart places the end sections 22 in tension. The tension causes a clean fracture to propagate around each end section 22 from the point at which each was scored by the blade 24, to provide a clean surface for splicing. This can also ensure the accuracy of the cleave. Conveniently, the portions 46 of the end sections 22 which have been cleaved from the optic fiber cores 12a, 12b, as shown in FIG. 6, are securely held in the retaining devices 18 and thus need not be separately disposed with. Moreover, as the holder bodies 16 are brought together to splice the optic fiber cores 12a, 12b, portions 46 enter respective excess cable apertures 47, one of which is shown in FIG. 7B.

As mentioned above, the actuator 26 translates relative to the holder bodies 16 along tracks 28 provided in the holder bodies 16, the tracks 28 being shaped to accommodate rails 30 of the scoring device 20. In the present case, the tracks 28 and rails 30 are disposed at an angle α (i.e. partially transversely) to the trajectory $D_x$ of the scoring device 20, as shown in FIG. 7B. Thus, as the scoring device 20 progresses along the trajectory $D_x$, the holder bodies 16 move across the faces 45 of the scoring device 20 in opposite directions $B_1$, $B_2$. This movement brings the end sections 22, which are initially inserted in a parallel but non-coaxial manner, as shown in FIG. 4, into alignment. The underside of each holder body 16 is also provided with a rail 50, as shown in FIG. 3, which is received in a track 52, part of which is shown in FIG. 6, in the base 36. The rail 50 and track 52 serve to guide the movement of the holder bodies 16 away from each other and across the faces 45, as the actuator 26 moves towards to the base 38 and between the retaining portions 18.

Figure 8:
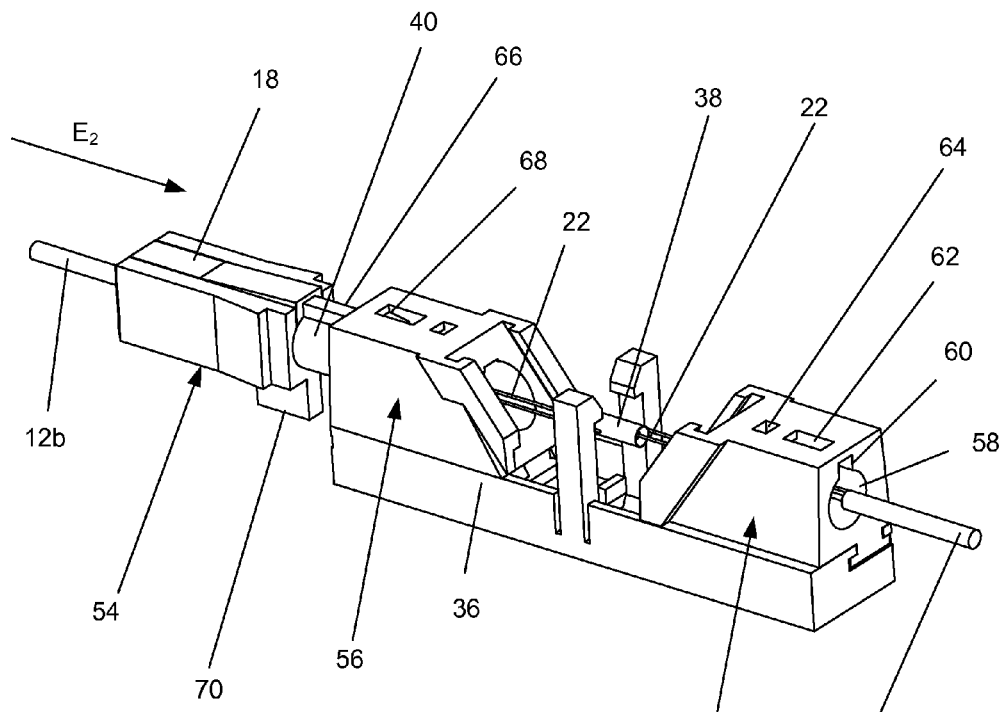
FIG. 8 shows a side perspective view of the apparatus of FIG. 1, partially disassembled.

Each holder body 16 includes two sections, namely a receiving portion 54, as shown in FIGS. 2 and 8, for receiving and holding end sections 22 of optic fiber cores 12a, 12b, and a hub 56, operatively coupled with the receiving portion 54 and including the rail 50, as shown in FIG. 3, which seats in the track 52, as shown in FIG. 6, of the base 36. The receiving portions 54 move towards each other to affect splicing of optic fiber cores 12a, 12b.

The hub 56 serves to locate the receiving portion 54 relative to the scoring device 20 (not shown) and includes a recess 58 for receiving a sleeve 40 of a retaining device 18. The recess 58 includes a notch 60, a hold aperture 62 and splicing aperture 64, and the sleeve 40 includes an elongate protrusion 66 having a tip 68, the protrusion 66 being receivable in the notch 60 to guide insertion of the sleeve 40 into the recess 58. Initially, the protrusion is received in the notch 60, with the tip 68 being moveably received in the hold aperture 62. In this condition, the protrusion 66 prevents rotation of the sleeve 40 in the recess 58.

As the sleeve 40 extends into the recess 58 in direction $E_2$, the tip 48 progresses along the hold aperture 62 towards the splicing aperture 64. As the sleeve 40 becomes fully inserted into the recess 58, the tip 68 snaps into position in the splicing aperture 64 and prevents removal of the sleeve 40 from the recess 58, thus holding the receiving portion 54 in fixed relation to the hub 56.

The receiving portions 54 are also provided with a tab 70, as shown in FIG. 5, which limits insertion of the sleeve 40 into the recess 58 by coming into abutment against the hub 56 and/or base 36 when the sleeve 40 is fully inserted. Furthermore, before splicing, pegs 72 are clamped about the sleeves 40 of the retaining devices 18, thus preventing the sleeve 40 from being prematurely inserted into the recess 58. Such pegs 72 are known and will not be discussed herein in further detail.

Figure 9:
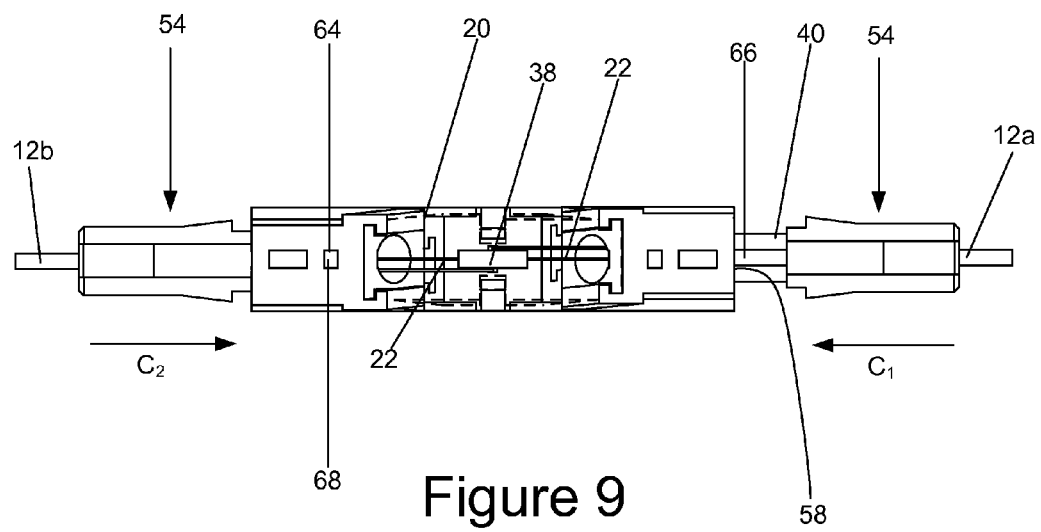
FIG. 9 shows a top view of the apparatus of FIG. 1, partially disassembled.

When in the splicing condition, the end sections 22 of the optic fiber cores 12a, 12b have been cleaved and the tang 34 of the base 36 is received in the notched groove 32 of the scoring device 20, thus holding the scoring device in fixed relation to the base 36. In so doing, the hub 56 of each holder body 16 is held in fixed relation to the scoring device 20 as it cannot slide along either of tracks 28, 52 as movement along one of those tracks 28, 52 is now precluded by the immobility of the other of those tracks 28, 52, due to the scoring device 20 and base 36 being fixed relative to each other. Thus, movement of the hubs 56 is precluded. At this point, the pegs 72 are removed and the receiving portions 54 can be brought together in directions $C_1$, $C_2$, as shown in FIG. 9 (in which one receiving portion 54 has been moved in direction $C_2$, and the scoring device 20 is shown in broken lines), thereby inserting the sleeves 40 into respective recesses 58, moving the tips 68 of the protrusions 66 into the splicing apertures 64, and also bringing the cleaved end sections 22 together in the ferrule 38, to splice the optic fiber cores 12a, 12b.

Figure 10:
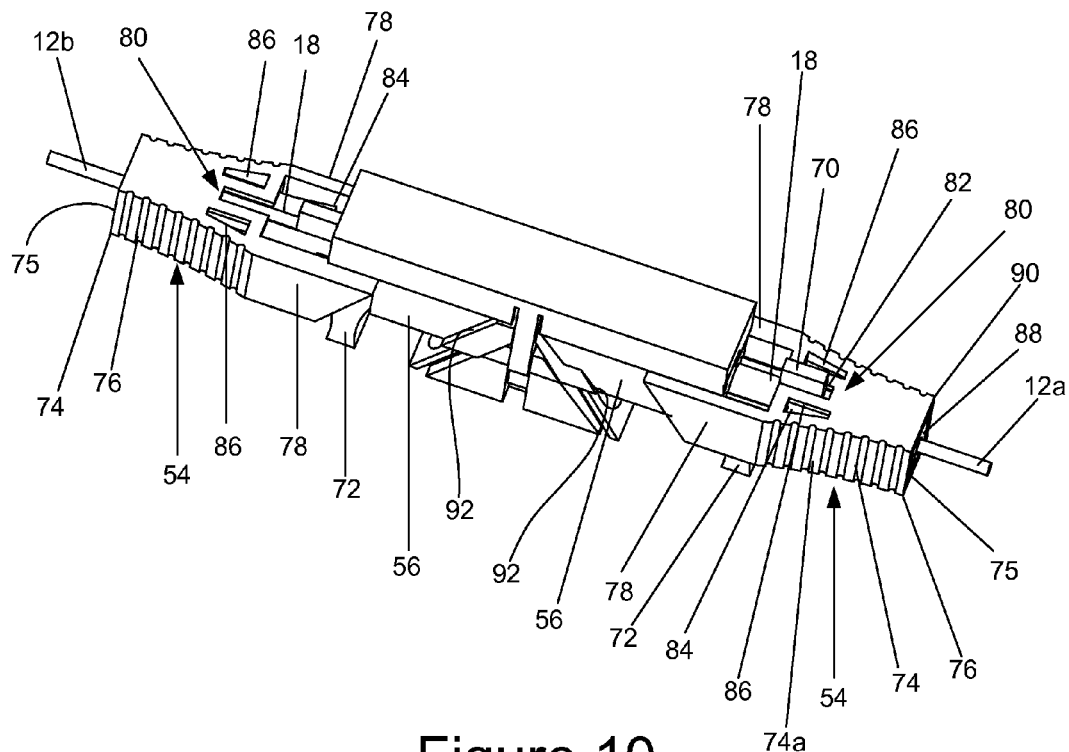
FIG. 10 shows a bottom perspective view of the apparatus of FIG. 1.

The receiving portions 54, as shown in FIG. 10, further include grips 74 each of which has an orifice 75 through which respective optic fiber cores 12a, 12b are received. The grips 74 include a corrugated surface 76 to afford gripping by the hand of a user, arms 78 for positioning the grips 74 relative to respective hubs 56 and cutaway features 80. Once an end section 22 (not shown) is received within a retaining device 18, the corresponding grip 74 is pushed onto the retaining device 18 (as shown by the position of the grip 74a) and, in doing so, the tab 70 is received in a slot 82 of the cutaway features 80, barbs 84 on the retaining device 18 are received in corresponding angular slots 86, to hold the grip 74 in position over the retaining device 18, and the arms 78 extend down either side of the hub 56 to ensure accurate positioning of the receiving portion 54 relative to the hub 56 and, consequently, relative to the ferrule 38. When in this position, the end 88 of the retaining device 18 and the end 90 of the grip 74 are substantially coplanar.

Figure 11:
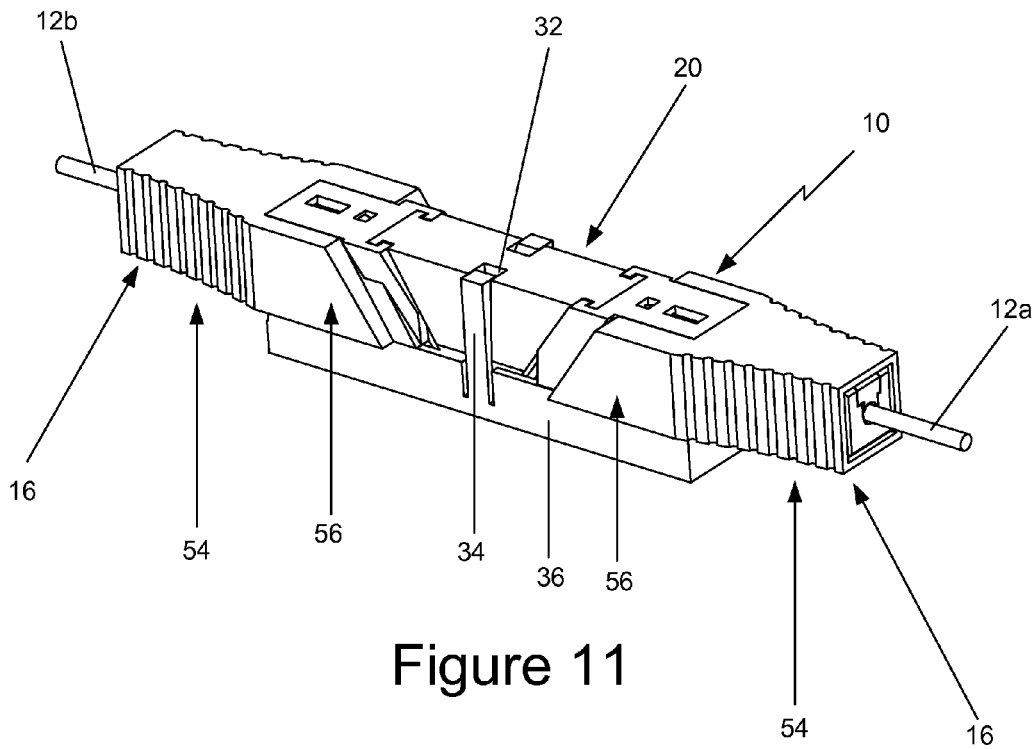
FIG. 11 shows the apparatus of FIG. 1 after completion of the splicing process.

When in the splicing condition, the pegs 72 are removed and the grip 74, along with the retaining device 18 to which it is now coupled, can be urged towards the corresponding hub 56. This causes the sleeve 40 to be inserted into, and held within, the recess 60, the arms 74 come into abutment with limiting faces 92, provided on the sides of the hub 56, and the optic fiber cores 12a, 12b are spliced together. At this stage, the apparatus 10 assumes its final and fixed position, as shown in FIG. 11.

A technician may use the apparatus 10 to mechanically splice two optic fiber cores 12a, 12b, by performing the following steps:

(a) inserting end sections of optic fiber cores 12a, 12b into retaining devices 18 of respective holder bodies 16, thereby positioning the end sections for scoring by the scoring device 20;

(b) operating the scoring device 20 to move along the trajectory $D_x$ to score the end sections 22;

(c) operating the scoring device 20 to move further along the trajectory $D_x$ to urge the holder bodies 16 apart to cleave the end sections 22; and (d) moving the holder bodies 16 relative to one another to affect mechanical splicing of said optic fiber cores 12a, 12b.

For the step (a), the optic fiber cores 12a, 12b will generally be stripped of their sheathing, or be otherwise exposed, prior to insertion into the retaining devices 18. The insertion step (a) will also generally involve insertion of end sections 22 of the optic fiber cores 12a, 12b into channel portions 42 of respective retaining devices 18, until the end section extends through the trajectory $D_x$ of the scoring device 20 and into the opposite retaining device 18. Hereafter, the inserts 44 will be inserted into the channel portions 42 to secure the end sections 22 in a position for scoring by the scoring device 20. The grips 74 can then be moved on the respective retaining devices 18 until the tab 70 is received in the slot 82 and the barbs 84 are received in the angular slots 86, thereby preventing the grips 74 from coming free from the retaining devices 18 and also preventing the insert 44 from coming out of the channel portion 42. Furthermore, before or after the insertion step, the pegs 72 can be applied to the sleeves 40 of the receiving portions 54 of the retaining devices 18, to prevent their premature insertion into the recesses 58 of respective hubs 56.

At step (b), the scoring device 20 is moved along trajectory $D_x$ to affect scoring of the end sections 22. Further movement of the scoring device along the trajectory $D_x$, at step (c) causes the hubs 56 move up the faces 45 of the actuator 26 in the direction of divergence of those faces 45, such that the hubs 56 are forced apart in directions $A_1$, $A_2$. This force places the scored end sections 22 in tension, thereby affecting cleaving of those end sections 22. Due to the transversely disposed tracks 28, 50 and rails 30, 52, the movement of the scoring device 20 also causes movement of the hubs 56 in a direction transverse to the trajectory $D_x$ of the scoring device 20, thus bringing the end sections 22 into alignment.

The movement of the scoring device 20 along the trajectory $D_x$ continues until the notched groove 32 of the scoring device 20 receives the tang 34 of the base 36 of the apparatus 10, at which point the scoring device 20, and incidentally each of the hubs 56, is held in fixed relation to the base 36.

At step (d), the pegs 72 are removed to allow movement of the receiving portions 54 relative to the hubs 56. At this point, the grips 74 are operated by the user to move the receiving portions 54 of the holder bodies 16 towards the hubs 56 (thereby moving the retaining devices 18 relative to/towards one another). This movement causes the sleeves 40 to move into the recess 58, the protrusion 66 to move further into the notch 60 and the tip 68 to progress from the hold aperture 62, into the splicing aperture 64. In order to pass between the apertures 62, 64, the tip 68 will depress slightly towards the base 36. After passing into the splicing aperture 64, the tip 68 will move back to its original position and thereby be received in the aperture. Due to the shape of the tip 68, it cannot be withdrawn from the splicing aperture 64 back into the hold aperture 62. To prevent the tip 68, and consequently the receiving portion 54, from moving further in the direction of the hub 56, the tab 70 comes into abutment against the hub 56 and/or base 36. This ensures the correct length of end section 22 is extended into the ferrule 38 in order to splice the optic fiber cores 12a, 12b. Therefore, the retaining devices 18 are now held in fixed relation to the hubs 56, which means the apparatus 10 as a whole is substantially rigid, and the end sections 22 are both received within the ferrule 38 in which mechanical splicing is affected.

A technician may also use the apparatus 10 to mechanically splice two optic fiber cores 12a, 12b, by performing the following steps:
(a) stripping off the outer sheath(s) of the optic fiber cores 12a, 12b;
(b) placing the grips 74 over the optic fiber cores 12a, 12b;
(c) locating the end sections 22 in the channels 42 of the retaining devices 18;
(d) placing the inserts 44 into the channels to secure the end sections 22 therein;
(e) urging the grips 74 onto the retaining devices 18 until they are secured thereto when the barbs 84 of the retaining devices 18 are received within the angular slots 86 on the grips 74;
(f) depressing the actuator 26 along its trajectory $D_x$, causing:
 (i) the scoring of the end sections 22;
 (ii) movement of the holder bodies 16 away from each other thereby cleaving the scored end sections 22;
 (iii) transverse movement of the holder bodies 16 to bring the end sections 22 into alignment; and
 (iv) receipt of the tang 34 of the base 36 in the groove 32, to hold the scoring device 20 to the base 36;
(g) removing the pegs 72; and
(h) urging the grips 74, along with the retaining devices 18, towards each other, which:
 (i) brings the arms 78 into abutment with the limiting faces 92;
 (ii) inserts the sleeves 40 into respective recesses 58; and
 (iii) affects mechanical splicing of the optic fiber cores 12a, 12b.

Advantageously, the entire cleaving, aligning and splicing process is performed after the end sections 22 are inserted into the apparatus 10, and can thus occur without exposure of the cleaved end sections 22 to the atmosphere. Furthermore, as the operator only manipulates the device, and only using simple movements, most or all of the operator error can be removed when affecting a mechanical splice of two optic fiber cores 12a, 12b.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

LIST OF PARTS

10 Apparatus
12a, 12b Optic Fiber Cores
16 Holder Bodies
18 Retaining Device
20 Scoring Device
22 End Section (of optic fiber core)
24 Blade
26 Actuator
28 Track
30 Rail
32 Notched Groove
34 Tang
36 Base
38 Ferrule
40 Sleeve
42 Channel Portion
44 Insert
45 Faces (of actuator)
46 Portions (cleaved from end sections of optic fiber cores)
50 Rail
52 Track
54 Receiving Portion
56 Hub
58 Recess (in hub)
60 Notch (in recess)
62 Hold Aperture
64 Splicing Aperture
66 Protrusion
68 Tip (of protrusion)
70 Tab
72 Peg
74 Grip
76 Corrugated Surface
78 Arms
80 Cutaway Features
82 Slot (of cutaway features)
84 Barbs
86 Angular Slots (of cutaway features)
88 End (of retaining portion 18)
90 End (of grip)
92 Limiting face (of hub)
$D_x$ Trajectory (of scoring device)
$A_1, A_2, B_1, B_2, C_1, C_2, E_1$ Directions of Movement (of the holder bodies or parts thereof)

The invention claimed is:

1. An apparatus for mechanically splicing two optic fiber cores, comprising:
 (a) two holder bodies, moveable relative to each other, each of which includes a retaining device configured to receive, and hold, end sections of said optic fiber cores; and
 (b) a scoring device coupled with the holder bodies and operable to move along a trajectory relative to the holder bodies, each retaining device being arranged so that said end sections extend therefrom through said trajectory, wherein the scoring device scores the end sections of said optic fiber cores upon movement along the trajectory, and further movement of the scoring device along the trajectory forces the holder bodies away from each other to cleave the end sections of the optic fiber cores; and relative movement of the holder bodies brings cleaved end sections together to affect mechanical splicing of the optic fiber cores.

2. An apparatus according to claim 1, wherein the scoring device includes a first part of a sliding coupling and the holder bodies include a second part of the sliding coupling, the sliding coupling being arranged to guide the movement of the scoring device.

3. An apparatus according to claim 2, wherein the sliding coupling is at least partially transversely disposed relative to the trajectory of the scoring device, such that movement of the scoring device along the trajectory causes at least one said holder body to move in a direction transverse to the trajectory, to align the optic fiber cores.

4. An apparatus according to claim 1, wherein the optic fiber cores are received in the holder bodies in a substantially parallel and non-coaxial manner.

5. An apparatus according to claim 2, wherein the scoring device includes a substantially wedge-shaped actuator having two faces diverging away from each other, the first part of the sliding coupling being provided on both faces, and wherein movement of the scoring device along the trajectory moves the holder bodies up the faces in the direction of the divergence, thereby forcing the holder bodies away from each other to place the optic fiber cores in tension to affect cleaving thereof.

6. An apparatus according to claim 1, further including a securing device for securing said scoring device in fixed relation to said apparatus, after cleaving.

7. An apparatus according to claim 6, wherein said securing device comprises a tang and notched groove for receiving said tang, the apparatus further including a base having one of said tang and notched groove and the scoring device including the other of said tang and notched groove, and wherein the tang is received in the notched groove to hold the scoring device in fixed relation to the base.

8. A method for splicing two exposed optic fiber cores including the steps of:

(a) an apparatus for mechanically splicing two optic fiber cores, comprising:
  (i) two holder bodies, moveable relative to each other, each of which includes a retaining device configured to receive, and hold, end sections of said optic fiber cores; and
  (ii) a scoring device coupled with the holder bodies and operable to move along a trajectory relative to the holder bodies, each retaining device being arranged so that said end sections extend therefrom through said trajectory;
(b) inserting end sections of optic fiber cores into retaining devices of respective holder bodies, thereby positioning said end sections for scoring by the scoring device;
(c) operating the scoring device to move along the trajectory to score said end sections;
(d) operating said scoring device to move further along said trajectory to urge the holder bodies apart to cleave the end sections; and
(e) moving said holder bodies relative to one another to affect mechanical splicing of said optic fiber cores.

9. A method according to claim 8, wherein inserting end sections of optic fiber cores involves inserting end sections of optic fiber cores in a parallel and non-coaxial manner.

10. A method according to claim 8, further including the step of operating said scoring device until a securing mechanism holds said scoring device in fixed relation to a base of said apparatus.

\* \* \* \* \*